United States Patent [19]

Miksic et al.

[11] Patent Number: 5,855,975
[45] Date of Patent: *Jan. 5, 1999

[54] ANTI-CORROSION PLASTIC FILM CONTAINING RECYCLED RESIN

[75] Inventors: Boris A. Miksic, North Oaks; Joseph M. Foley, Maplewood, both of Minn.

[73] Assignee: Cortec Corporation, St. Paul, Minn.

[*] Notice: The term of this patent shall not extend beyond the expiration date of Pat. No. 5,139,700.

[21] Appl. No.: 491,533

[22] Filed: Jun. 16, 1995

Related U.S. Application Data

[63] Continuation of Ser. No. 149,387, Nov. 9, 1993, abandoned.

[51] Int. Cl.[6] ...................................................... B32B 5/16
[52] U.S. Cl. ........................ 428/35.8; 428/35.9; 428/331; 428/404; 428/461; 428/903.3; 428/910
[58] Field of Search ..................................... 428/331, 458, 428/461, 903.3, 910, 35.8, 35.9, 404

[56] References Cited

U.S. PATENT DOCUMENTS 4,885,352 12/1989 Erickson ............................... 526/348.1
5,139,700 8/1992 Miksic et al. ......................... 252/389.54
5,209,869 5/1993 Miksic et al. ......................... 252/389.54

OTHER PUBLICATIONS

"Plastics recycling: Becoming a Realty", Nancy Allbee, *Plastics Compounding*, May/Jun., 1993, pp. 32–37.

"Additives for Recycling—Maintaining Value the Second Time Around", Joseph Ogando, *Plastics Technology*, Jul. 1993, pp. 56–60.

*Primary Examiner*—H. Thi Le
*Attorney, Agent, or Firm*—Haugen and Nikolai, P.A.

[57] ABSTRACT

A resinous film at least partially formulated from a recycled resin and containing a vapor phase corrosion inhibitor. One embodiment of the invention is a single layer film which is formulated from three components. The first component is a recycled resin such as polyethylene, the second component is a fresh resin identical to the first, and the third component is a vapor phase anti-corrosion agent. Multi-layer films are also included. The films emit the anti-corrosion agent over a period of time to thereby protect items encased by the film.

29 Claims, No Drawings

ANTI-CORROSION PLASTIC FILM CONTAINING RECYCLED RESIN

CROSS-REFERENCE TO RELATED APPLICATIONS

The present application is a continuation of parent application Ser. No. 08/149,387, filed Nov. 9, 1993 of Boris A. Miksic, et al, entitled "ANTI-CORROSION PLASTIC FILM CONTAINING RECYCLED RESIN", now abandoned.

BACKGROUND OF THE INVENTION

This invention relates in general to plastic film products, and in particular to a plastic film containing an anti-corrosion agent and wherein at least a portion of the film is formulated with recycled plastic.

Recycled resins represent an important and significant source for material useable in the production of plastic products. ASTM standard D 5033-90 defines the various types of recycled plastics. Non-limiting examples of such plastics are post consumer recycled plastics which are defined in the ASTM standard as "products generated by a business or consumer that have served their intended end uses, and that have been separated or diverted from solid waste for the purpose of collection, recycling, and disposition." After use, discarded recyclable items are processed to yield a resin usually supplied in pellet form which can be used again in the formulation of another product. Such reuse is beneficial to the environment and acts to conserve natural resources.

Because the history of recycled resin is unknown, however, it can be possible that this resin will have corrosive properties which can cause an untoward effect upon, for example, an article which is susceptible to corrosion and which is subsequently packaged within a film containing a recycled component. Commonly assigned U.S. Pat. No. 5,139,700, incorporated herein, discloses films having incorporated therein corrosion inhibitors for the protection of items to be packaged by those films. However, because the resins used for the described films are fresh, no need existed to address a problem of corrosion causation by the resin itself. A need is thus evident for incorporating anti-corrosion agents with recycled resins to thereby counteract possible corrosive agents therein while promoting effective utilization of a recycled commodity.

It is therefore a primary object of the present invention to provide a resin film containing a vapor phase anti-corrosion agent and wherein at least one component thereof is a recycled plastic.

Another object of the present invention is to provide a resin film formulated at least in part from a recycled plastic and containing an effective amount of a vapor phase anti-corrosion agent sufficient to overcome corrosive agents within the recycled plastic and to provide corrosion protection for items subsequently encased by the film.

Yet another object of the present invention is to provide a multi-layer laminate film wherein at least one of the layers is formulated at least in part from recycled plastic and wherein the film possesses vapor phase anti-corrosion properties.

These and other objects of the present invention will become apparent throughout the description which now follows.

SUMMARY OF THE INVENTION

The present invention is a resinous film at least partially formulated from a recycled resin and containing a vapor phase corrosion inhibitor. Formulations of the corrosion inhibitor are compatible with the resins, preferably polyethylene or polypropylene, and are extruded therewith during manufacture of the film. One embodiment of this invention is a single layer film which is formulated from three components. The first component is a recycled resin, the second component is a original, non-recycled resin, and the third component is a vapor phase anti-corrosion agent. Preferable anti-corrosion agents are formulations of powdered anhydrous molybdates mixed with benzotriazole and sodium nitrite, or amine benzoates mixed with amine nitrates and benzotriazole. Preferably, the formulations are deposited on powder or granular silica gel particles. The film emits the anti-corrosion agent over a period of time to thereby protect items encased by the film.

Another embodiment is a double layer laminated resin film comprising a first layer formulated from a recycled resin and a second layer formulated from a fresh resin. The second layer has incorporated therewith the anti-corrosion agent. Because the two layers of the double layer film are not permeable with respect to each other, corrosive-agent content of the recycled resin is not a concern so long as the second layer containing the fresh resin with the anti-corrosion composition surrounds an item to be protected, thereby positioning the first layer formulated with recycled resin externally.

A third embodiment is a triple layer laminate product wherein the layers comprise, in order, a first resin film layer formulated according to the single layer film defined above, a second metallic layer, and a third resin film layer formulated from a biaxially oriented polyethylene terephthalate. This triple layer film provides tear-resistant properties because of the polyethylene terephthalate layer, and reduced or eliminated static build-up because of the metallic layer.

A fourth embodiment is a single layer film formulated only from a recycled resin and a vapor phase anti-corrosion agent. Use of recycled resin only to construct a film can occur so long as structural integrity of the film is adequate and the resin does not possess more corrosive-agent materials than can be adequately addressed by the incorporated anti-corrosion composition.

The films described above must contain a sufficient amount of the anti-corrosion composition both to overcome any corrosive properties inherent to the recycled product and to provide adequate emission therefrom to protect items which are encased by the film. In this manner, a twofold purpose is accomplished whereby recycled resin is employed while items subject to environmental corrosion are protected.

DETAILED DESCRIPTION OF PREFERRED EMBODIMENT

In preparing single layer or multi-layer resin films of the present invention, an anti-corrosion composition is first formulated for subsequent incorporation into the film.

EXAMPLE IA

One preferred vapor phase corrosion inhibitor for extruded polyethylene film includes a mixture of either anhydrous sodium molybdate, anhydrous ammonium dimolybdate, or an amine molybdate, together with sodium nitrite and benzotriazole. In a particularly preferred embodiment, a mixture in powder form is provided which comprises, by weight, about 70% anhydrous sodium molybdate, about 25% sodium nitrite, and about 5% benzotriazole. This mixture is particularly effective when extruded into polyethylene film at a rate of 2% by weight, and has been found to be effective at a rate of up to 3% by weight. The useful range of the above listed components is, by weight, from about 65% to about 75% anhydrous sodium molybdate, from about 22% to about 28% sodium nitrite, and from about 4% to about 6% benzotriazole.

EXAMPLE IB

The powder mixture of Example IA is deposited upon granular silica gel, and is particularly effective when the powder has a particle size below about 1 micron. The relative weight ratios are preferably about 45% vapor phase corrosion inhibitor component, and about 55% silica gel, although ratios of between about 30% and 50% vapor phase corrosion inhibitor component and between about 50% and 80% silica gel may be employed.

Amine molybdates according to the following structural formula

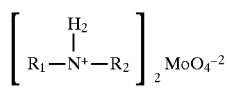

are useful in connection with the present invention. The synthesis of three amine molybdate compounds will be described below in Examples II, III and IV. The aliphatic amines employed are from the group consisting of dicyclohexylamine, 2-ethylhexylamine, and cyclohexylamine, but it is to be understood that other aliphatic amines within this general category can be found useful as well.

EXAMPLE II

A formulation is prepared with the following components, with percentages shown by weight: 10% dicyclohexylamine (molecular weight: 181.36; empirical formula $C_{12}H_{23}N$); 4% phosphoric acid; 36% water; and 50% aqueous solution of ammonium molybdate (20%). The ammonium molybdate solution is prepared by adding pure molybdenum trioxide to a 5% aqueous solution of ammonium hydroxide. The pH of the resulting solution is normally in the range of 7.5 to 8.5. The dicyclohexylamine, phosphoric acid and water are mixed together to form a neutral to slightly alkaline solution, the pH being in the range of 7.5 to 8.5. The aqueous solution of ammonium molybdate is then added. The reaction that occurs is a simple displacement reaction in which a white powdery precipitate is formed upon addition of the ammonium molybdate solution. Following the completion of the reaction, the mixture is cooled to approximately 60° F., after which the precipitate is filtered, washed, and dried until the anhydrous form is obtained. The anhydrous finished product is a fine white powder having the structural formula shown above wherein $R_1$ and $R_2$ are cyclohexyl radicals.

EXAMPLE III

A formulation is prepared with the following components: 5% $^2$-ethylhexylamine (molecular weight: 129.2; empirical formula: $C_8H_{19}N$); 2.5% phosphoric acid; 67.5% water; and 25% aqueous solution of ammonium molybdate (20%). The 20% ammonium molybdate solution is prepared as set forth in Example II. The $^2$-ethylhexylamine, phosphoric acid and water are mixed together to form a neutral to slightly alkaline solution, the pH being in the range of 7.5 to 8.5. The aqueous solution of ammonium molybdate is then added. The reaction that occurs is a simple displacement reaction in which a white powdery precipitate is formed upon addition of the ammonium molybdate solution. Following the completion of the reaction, the mixture is cooled to approximately 60° F., after which the precipitate is filtered, washed and dried until the anhydrous form is obtained. The anhydrous finished product according to the structural formula shown above wherein $R_1$ is a 2-ethylhexyl radical and $R_2$ is hydrogen.

EXAMPLE IV

A formulation is prepared with the following components: 20% cyclohexylamine (molecular weight: 99.17; empirical formula: $C_6H_{11}NH_2$); 13% molybdenum trioxide (pure); and 67% water. The water, molybdenum trioxide and cyclohexylamine are mixed together all at once. While mixing, the solution is heated to approximately 175° F. When the solution becomes clear, the mixture is cooled to 60°–70° F., whereupon a gray-white precipitate forms. The precipitate is filtered, washed and dried until the anhydrous form is obtained. The anhydrous finished product is a white crystallin powder according to the above structural formula wherein $R_1$ is a cyclohexyl radical and wherein $R_2$ is hydrogen.

While dicyclohexylamine, 2-ethylhexlamine, and cyclohexylamine have been indicated as the most desirable materials, it is to be noted that certain conditions of end use along with certain other considerations and parameters may dictate that somewhat smaller aliphatic chain lengths be employed. For example, use of this material in somewhat cooler environments may render it desirable to utilize materials having a somewhat shorter chain length in order to achieve an appropriate degree of sublimation while exposed to ambients. Other considerations may indicate utilization of such shorter chain links as well.

Effective mixtures of the amine molybdates of Examples II, III or IV are normally formulated utilizing 70% by weight anhydrous amine molybdate of the type shown in Examples II, III and IV above, 25% sodium nitrite, and 5% benzotriazole. The mixture is deposited on a powder or granular silica gel in a preferred weight ratio of about 45% corrosion inhibitor and about 55% silica gel. Ratios of about 30% to about 50% corrosion inhibitor and about 50% to about 70% silica gel are operable.

EXAMPLE V

A second particularly useful vapor phase corrosion inhibitor component comprises a mixture of amine benzoates, amine nitrates and benzotriazole. Specifically, the following formulation provides a particularly preferred embodiment:

| Component | Percent by Weight |
|---|---|
| Cyclohexylamine benzoate | about 68% |
| Ethylamine benzoate | about 10% |
| Dicyclohexylamine nitrate | about 20% |
| Benzotriazole | about 2% |

This mixture, also in powdered form and having a particle size below about 1 micron, is deposited upon granular silica gel, with relative weight ratios the same as recited above for the formulations containing molybdates. The useful range of the preferred formulation shown above is as follows:

| Component | Percent by Weight |
| --- | --- |
| Cyclohexylamine benzoate | about 50%–about 97% |
| Ethylamine benzoate | about 1%–about 20% |
| Dicyclohexylamine nitrate | about 1%–about 20% |
| Benzotriazole | about 1%–about 10% |

Preparation of compositions containing these components are prepared by simply blending the individual powdered components together.

While there are various techniques that may be employed for providing an appropriate extrudate including, for example, polyethylene and a vapor phase corrosion inhibitor-desiccant of the type described herein, one particular technique has been found to be particularly useful. Specifically, the composite formulation is formed and rendered as uniform in particle size and configuration as possible. This composite is then combined with a relatively limited quantity of polyethylene with the mixture then being passed through the barrel of a conventional extruder to form a master batch. The resultant master batch is then chopped and rendered into pellet form. These pellets are, in turn, combined with additional polyethylene and then extruded as the film containing a vapor phase corrosion inhibitor-desiccant of the type described.

EXAMPLE VI(a)

A single layer polyethylene film having incorporated therein a vapor phase corrosion inhibitor is prepared by blending 75% by weight fresh polyethylene resin and 25% by weight post consumer recycled polyethylene resin, to which is added, in a quantity equal to 2% by weight of the resin mixture, a corrosion inhibitor agent of Example V. The resulting composition is formed and rendered into pellet form as described above, and, in turn, the pellets are extruded as a film containing the vapor phase corrosion inhibitor of the type described. As in this Example and in all film constructions employing post consumer recycled resin, a pigment addition to the formulation may be required or desirable to provide a color adjustment. Likewise, in all film constructions, particular formulations and quantities of anti-corrosion agents can be adjusted as appropriate to meet specific requirements of an item to be protected, the environment of use, and the corrosive impurities present in the recycled resin.

EXAMPLE VI(b)

Instead of including a fresh polyethylene resin, a single layer polyethylene film having incorporated therein a vapor phase corrosion inhibitor is prepared by adding the corrosion inhibitor agent of Example V to a polyethylene resin which is 100% post consumer recycled resin. The resulting composition is formed to a master batch which is rendered into pellet form and finally extruded as a film containing a vapor phase corrosion inhibitor and produced from 100% post consumer recycled polyethylene.

EXAMPLE VII

A double layer laminated polyethylene film having incorporated therein a vapor phase corrosion inhibitor is prepared by providing a master batch of post consumer recycled polyethylene resin and a master batch of fresh polyethylene resin. The fresh polyethylene resin has incorporated therein an anti-corrosion agent as defined in Example V. Each of the master batches of recycled resin and fresh resin is chopped and rendered into pellet form, and the two resins are thereafter coextruded to thereby produce the double layer laminated polyethylene film. In use, the film is positioned about an item to be protected so that the fresh-resin layer containing the anti-corrosion agent is surrounding the protected item while the layer constructed of the recycled resin is exteriorly disposed.

EXAMPLE VIII

A triple layer laminated film having incorporated therein a vapor phase corrosion inhibitor is prepared by providing a plastic film such as biaxially oriented polyethylene terephthalate having a metallic layer deposited thereon. A polyethylene film produced according to either of Examples VI(a) or VI(b) is then laminated to the metallic layer to form a triple layer composite film having anti-corrosion properties.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

We claim:

1. A single layer resin film formulated from a resinous first component comprising a post-consumer recycled plastic, a resinous second component comprising an original, non-recycled plastic resin identical in composition to the recycled plastic resin, and a vapor phase anti-corrosion third component embedded within the resin film and being deposited upon the surface of a silica gel particulate substrate.

2. A single layer resin film as claimed in claim 1 wherein the third component comprises a mixture by weight of from about 22% to about 27% sodium nitrite, from about 4% to about 6% benzotriazole, and from about 65% to about 85% anhydrous molybdate selected from the group consisting of sodium molybdate, ammonium dimolybdate, amine dimolybdates, and mixtures thereof.

3. A single layer resin film as claimed in claim 1 wherein the first and second substantially identical components are polyolefins selected from the group consisting of polyethylene and polypropylene.

4. A single layer resin film as claimed in claim 3 wherein the weight of the first component is from about 25% to about 50% of the weight of the second component.

5. A single layer resin film as claimed in claim 1 wherein the third component comprises a mixture of from about 50% to about 97% by weight cyclohexylamine benzoate, from about 1% to about 20% by weight ethylamine benzoate, from about 1% to about 20% by weight dicyclohexylamine nitrate, and from about 1% to about 10% by weight benzotriazole.

6. A single layer resin film formulated from a resinous first component comprising a post-consumer recycled plastic, a resinous second component comprising an original, non-recycled plastic resin identical in composition to the recycled plastic resin, and a vapor phase anti-corrosion third component embedded within the resin film and being deposited upon the surface of a silica gel particulate substrate;

(a) wherein said third component comprises a mixture by weight of from about 22% to about 27% sodium nitrite, from about 4% to about 6% benzotriazole, and from about 65% to about 85% anhydrous molybdate selected from the group consisting of sodium molybdate, ammonium dimolybdate, amine dimolybdates, and mixtures thereof;

(b) wherein the vapor phase anti-corrosion third component is deposited on said silica gel particulate substrate.

7. A single layer resin film as claimed in claim 6 wherein the anti-corrosion third component comprises by-weight a mixture of about 25% sodium nitrite, about 5% benzotriazole, and about 75% anhydrous molybdate.

8. A single layer resin film as claimed in claim 6 wherein the anhydrous molybdate is an amine molybdate of the formula:

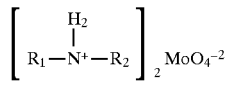

wherein $R_1$ is selected from the group consisting of a 2-ethylhexyl radical and an aliphatic hydrocarbon having up to seven carbon atoms, and wherein $R_2$ is selected from the group consisting of hydrogen, a 2-ethylhexyl radical, and an aliphatic hydrocarbon having up to seven carbon atoms.

9. A single layer resin film formulated from a resinous first component comprising a post-consumer recycled plastic, a resinous second component comprising an original, non-recycled plastic resin identical in composition to the recycled plastic resin, and a vapor phase anti-corrosion third component embedded within the resin film and being deposited upon the surface of a silica gel particulate substrate;

(a) wherein said third component comprises a mixture by weight of from about 22% to about 27% sodium nitrite, from about 4% to about 6% benzotriazole, and from about 65% to about 85% anhydrous molybdate selected from the group consisting of sodium molybdate, ammonium dimolybdate, amine dimolybdates, and mixtures thereof;

(b) wherein the vapor phase anti-corrosion third component is deposited on said silica gel particulate substrate; and (c) wherein the third component comprises by weight a mixture of about 68% cyclohexylamine benzoate, about 10% ethylamine benzoate, about 20% dicyclohexylamine nitrate, and about 2% benzotriazole.

10. A single layer resin film as claimed in claim 9 wherein the first and second substantially identical components are polyolefins selected from the group consisting of polyethylene and polypropylene.

11. A single layer resin film as claimed in claim 10 wherein the weight of the first component is from about 25% to about 50% of the weight of the second component.

12. A double layer laminated resin film comprising first layer formulated from a recycled plastic and a second layer formulated from an original, non-recycled plastic resin, with the second layer having contained therein a vapor phase corrosion inhibitor.

13. A double layer laminated resin film as claimed in claim 12 wherein the corrosion inhibitor component comprises a mixture by weight of from about 22% to about 27% sodium nitrite, from about 4% to about 6% benzotriazole, and from about 65% to about 85% anhydrous molybdate selected from the group consisting of sodium molybdate, ammonium dimolybdate, amine dimolybdates, and mixtures thereof.

14. A double layer laminated resin film as claimed in claim 12 wherein the corrosion inhibitor component comprises a mixture by weight of from about 50% to about 97% cyclohexylamine benzoate, from about 1% to about 20% ethylamine benzoate, from about 1% to about 20% dicyclohexylamine nitrate, and from about 1% to about 10% benzotriazole.

15. A double layer laminated resin film as claimed in claim 12 wherein the corrosion inhibitor component comprises by weight a mixture of about 68% cyclohexylamine benzoate, about 10% ethylamine benzoate, about 20% dicyclohexylamine nitrate, and about 2% benzotriazole.

16. A double layer laminated resin film as claimed in claim 15 wherein the resin is a polyolefin selected from the group consisting of polyethylene and polypropylene.

17. A double layer laminated resin film comprising a first layer formulated from a recycled plastic and a second layer formulated from an original, non-recycled plastic resin, with the second layer having contained therein a vapor phase corrosion inhibitor;

(a) wherein the corrosion inhibitor component comprises a mixture by weight of from about 22% to about 27% sodium nitrite, from about 4% to about 6% benzotriazole, and from about 65% to about 85% anhydrous molybdate selected from the group consisting of sodium molybdate, ammonium dimolybdate, amine dimolybdates, and mixtures thereof;

(b) wherein said corrosion inhibitor component is embedded within the resin film and being deposited upon the surface of a silica gel particulate substrate.

18. A double layer laminated layer resin film as claimed in claim 17 wherein said corrosion inhibitor component comprises by weight a mixture of about 25% sodium nitrite, about 5% benzotriazole, and about 75% anhydrous molybdate.

19. A double layer laminated resin film as claimed in claim 17 wherein the anhydrous molybdate is an amine molybdate of the formula:

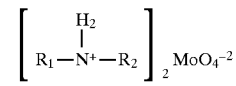

wherein $R_1$ is selected from the group consisting of a 2-ethylhexyl radical and an aliphatic hydrocarbon having up to seven carbon atoms, and wherein $R_2$ is selected from the group consisting of hydrogen, a 2-ethylhexyl radical, and an aliphatic hydrocarbon having up to seven carbon atoms.

20. A triple layer laminate product wherein the layers comprise in order:

(a) a first layer comprising a resinous first component comprising a recycled plastic, a resinous second component comprising an original, non-recycled plastic resin having a composition identical to the recycled plastic, and a vapor phase anti-corrosion third component;

(b) a second metallic layer; and (c) a third resin film layer formulated from a biaxially oriented polyethylene terephthalate.

21. A triple layer laminate product as claimed in claim 20 wherein the third component comprises a mixture by weight of from about 22% to about 27% sodium nitrite, from about 4% to about 6% benzotriazole, and from about 65% to about 85% anhydrous molybdate selected from the group consisting of sodium molybdate, ammonium dimolybdate, amine dimolybdates, and mixtures thereof.

22. A triple layer laminate product as claimed in claim 20 wherein the anti-corrosion third component comprises by weight a mixture of about 25% sodium nitrite, about 5% benzotriazole, and about 75% anhydrous molybdate.

23. A triple layer laminate product as claimed in claim 22 wherein the anhydrous molybdate is an amine molybdate of the formula:

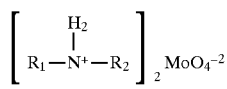

wherein $R_1$ is selected from the group consisting of a 2-ethylhexyl radical and an aliphatic hydrocarbon having up to seven carbon atoms, and wherein $R_2$ is selected from the group consisting of hydrogen, a 2-ethylhexyl radical, and an aliphatic hydrocarbon having up to seven carbon atoms.

24. A triple layer laminate product as claimed in claim 20 wherein the first and second substantially identical components are polyolefins selected from the group consisting of polyethylene and polypropylene.

25. A triple layer laminate product as claimed in claim 24 wherein the first component is from about 25% to about 50% by weight in relation to the second component.

26. A triple layer laminate product as claimed in claim 20 wherein the third component comprises by weight a mixture of from about 50% to about 97% cyclohexylamine benzoate, from about 1% to about 20% ethylamine benzoate, from about 1% to about 20% dicyclohexylamine nitrate, and from about 1% to about 10% benzotriazole.

27. A triple layer laminate product as claimed in claim 20 wherein the third component comprises by weight a mixture of about 68% cyclohexylamine benzoate, about 10% ethylamine benzoate, about 20% dicyclohexylamine nitrate, and about 2% benzotriazole.

28. A triple layer laminate product as claimed in claim 27 wherein the first and second substantially identical components are polyolefins selected from the group consisting of polyethylene and polypropylene.

29. A triple layer laminate product as claimed in claim 28 wherein the first component is from about 25% to about 50% by weight in relation to the second component.

* * * * *